United States Patent
Schöpf et al.

[11] Patent Number: 6,069,561
[45] Date of Patent: May 30, 2000

[54] AUTOMATIC LAMP CONTROL DEVICE

[75] Inventors: Klaus-Jürgen Schöpf, Ismaning; Gerhard Lohninger, München, both of Germany

[73] Assignee: Siemens Aktiengesellschaft, Munich, Germany

[21] Appl. No.: 09/211,108

[22] Filed: Dec. 14, 1998

Related U.S. Application Data

[63] Continuation of application No. PCT/DE97/01200, Jun. 11, 1997.

[51] Int. Cl.⁷ .................................................. G08B 13/18
[52] U.S. Cl. .................... 340/554; 315/159; 340/309.15; 340/693.5; 342/28; 343/700 MS
[58] Field of Search .................................. 340/552, 553, 340/554, 693.5, 309.15, 529; 342/27, 28; 367/93, 94; 343/700 MS; 350/214 AL; 315/157, 159; 307/116, 117; 174/53

[56] References Cited

U.S. PATENT DOCUMENTS

| | | | |
|---|---|---|---|
| 4,549,092 | 10/1985 | Matsuoka et al. | 340/552 X |
| 4,827,264 | 5/1989 | Bjelk | 342/61 |
| 4,943,712 | 7/1990 | Wilder | 250/221 |
| 4,982,176 | 1/1991 | Schwarz | 340/567 |
| 5,015,994 | 5/1991 | Hoberman et al. | 340/567 |
| 5,021,795 | 6/1991 | Masiulis | 343/700 |
| 5,142,199 | 8/1992 | Elwell | 340/567 X |

FOREIGN PATENT DOCUMENTS

| | | |
|---|---|---|
| 0440862 | 8/1991 | European Pat. Off. . |
| 0608552 | 8/1994 | European Pat. Off. . |
| 3540680 | 5/1994 | Germany . |
| 4419019 | 12/1995 | Germany . |
| 10074 | 6/1992 | WIPO . |

OTHER PUBLICATIONS

"Beleuchtungssteuerung mit Mikrowellensensoren", Gerhard Lohninger, Funkschau Dec. 1992, Part 1, pp. 82–86.
"Beleuchtungssteuerung mit Mikrowellensensoren", Gerhard Lohninger, Funkschau Dec. 1992, Part 2, pp. 82–88.

*Primary Examiner*—Thomas Mullen
*Attorney, Agent, or Firm*—Herbert L. Lerner; Laurence A. Greenberg; Werner H. Stemer

[57] ABSTRACT

An automatic lamp control device in which a Doppler radar module, a switching unit for switching a lamp circuit on and off, a circuit configuration for evaluating Doppler radar module signals and for producing signals for controlling the switching unit, and a power supply unit for supplying current to the Doppler radar module and to the circuit configuration are provided on a printed circuit board configuration. The lamp control device reacts to movements within the transmitting and receiving range of the Doppler radar module. The range is independent of the ambient temperature. The lamp control device can be configured to save space, in such a way that it can be integrated completely in a standard flush-mounted box.

8 Claims, 3 Drawing Sheets

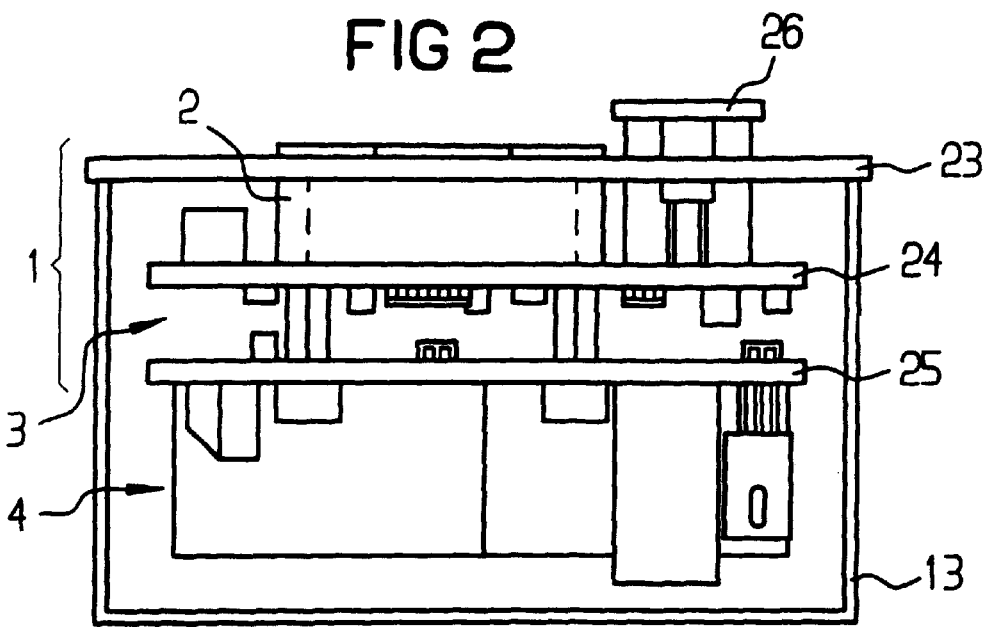
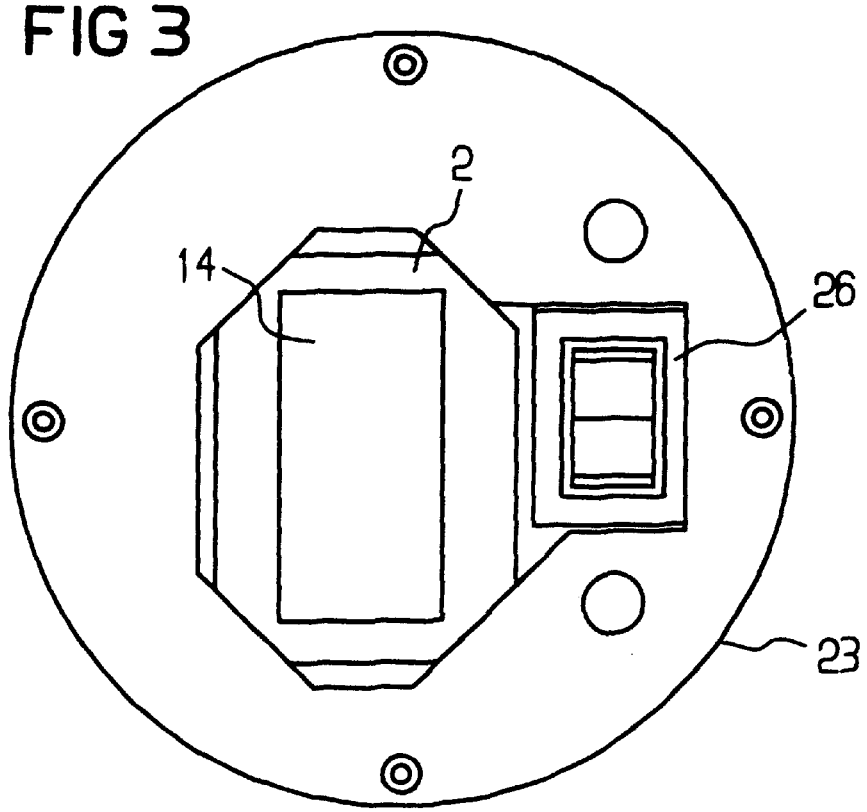

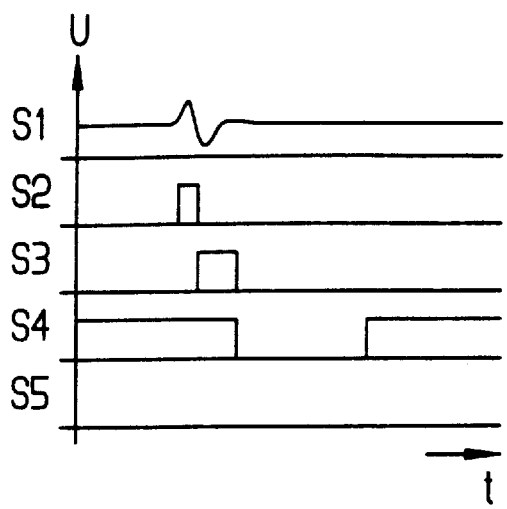
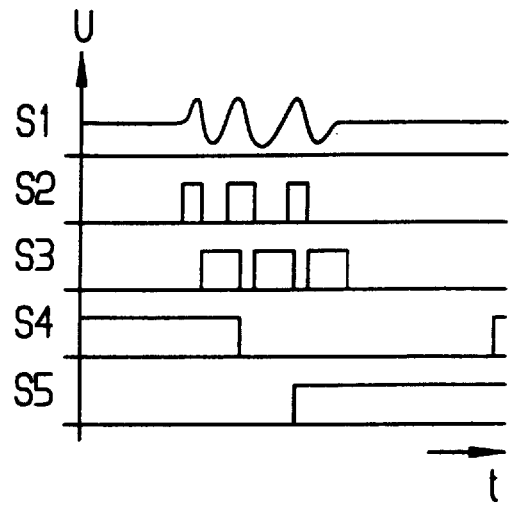
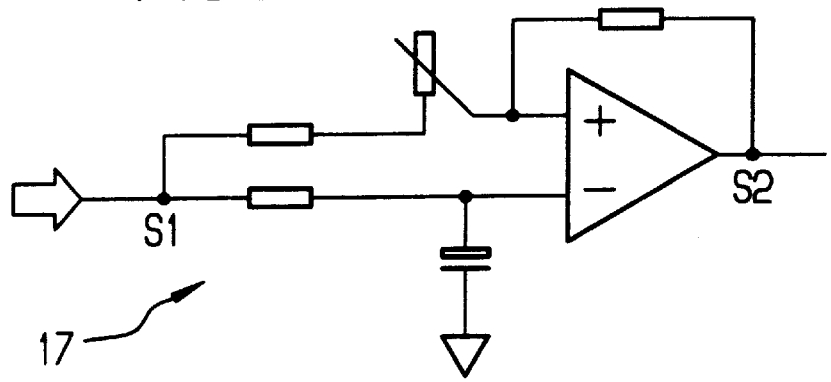

AUTOMATIC LAMP CONTROL DEVICE

CROSS-REFERENCE TO RELATED APPLICATION

This is a continuation of copending International Application PCT/DE97/01200, filed Jun. 11, 1997, which designated the United States and was published on Dec. 18, 1997 with the international publication number WO 97/48255.

BACKGROUND OF THE INVENTION

1. Field of the Invention

The invention relates to an automatic lamp control device.

The automatic lamp control device has a Doppler radar module outputting signals received and evaluated by a circuit configuration. The circuit configuration in turn controls a switching unit that switches on and off a lamp circuit.

A lighting controller having microwave sensors is described in G. Lohninger, Funkschau 12/1992, pp. 82–86 and Funkschau 13/1992, pp. 82–88. The controller contains two externally disposed radar modules, so-called outdoor units, which are connected by cable to an indoor unit (control unit) which has a control board and a power supply unit. The known lighting controller has a large number of electronic components, is of very complicated construction and has a large space requirement. Furthermore, it has the disadvantage that, when a short turn-on time is set for the lamps and there is constant movement in front of the sensor, the light is continually switched on and off.

SUMMARY OF THE INVENTION

It is accordingly an object of the invention to provide an automatic lamp control device which overcomes the above-mentioned disadvantages of the prior art devices of this general type, which is particularly fault-free and has as little circuit complexity as possible. In particular, it should be possible to integrate it completely, in a simple manner, in a flush-mounted box used conventionally in building engineering.

With the foregoing and other objects in view there is provided, in accordance with the invention, an automatic lamp control device, including: a Doppler radar module outputting Doppler radar module signals; a lamp circuit; a switching unit for switching the lamp circuit on and off; a circuit configuration receiving and evaluating the Doppler radar module signals and producing signals for controlling the switching unit, the circuit configuration having a time-domain filter reducing a susceptibility to faults, the time-domain filter having a monostable multivibrator, a first retriggerable timer coupled to the monostable multivibrator, and a second retriggerable timer coupled to the monostable multivibrator and to the first retriggerable timer, the time-domain filter specifying a variable length time interval after which it is possible to actuate the switching unit; and a power supply unit supplying current to the Doppler radar module and to the circuit configuration.

The invention provides for a Doppler radar module, a switching unit for switching a lamp circuit on and off, a circuit configuration for evaluating the Doppler radar module signals and for producing signals for controlling the switching unit, and a power supply unit for supplying current to the Doppler radar module and to the circuit configuration to be provided preferably on a single multilayer printed circuit board configuration. The circuit configuration has a time-domain filter for reducing the susceptibility of the lamp control device to faults. The time-domain filter has a monostable multivibrator, a first retriggerable timer coupled to the monostable multivibrator, and a second retriggerable timer coupled to the first retriggerable timer and to the monostable multivibrator. The time-domain filter is used to specify a time interval, of variable length, at the end of which it is possible to actuate the switching unit. This suppresses faults, such as the switching-on of a lamp as a result of voltage fluctuations in the power supply, which the circuit configuration could incorrectly interpret as Doppler radar module signals. The time-domain filter is configured such that the switching unit is not actuated immediately at the first signal from the Doppler radar module, but rather only at a subsequent signal, for example at the second signal.

In the description, the Doppler radar module signals are those electrical signals that are transmitted by the Doppler radar module when movements occur within its transmitting and receiving range.

Any set range within which the lamp control device according to the invention reacts to movements is advantageously independent of the ambient temperature of the lamp control device, since a Doppler radar module detects movements per se.

Furthermore, the lamp control device can be installed simply in a flush-mounted box (e.g. diameter approx. 55 mm) conventionally used in building engineering, or in another installation box. This is because the Doppler radar module, including the switching unit, the circuit configuration and the power supply unit can be produced simply, in an extremely space-saving manner. Furthermore, a Doppler radar module can advantageously be used to transmit and receive microwave radiation through covers, such as plastic lids, plaster or masonry. Hence, wherever a light switch is present in an installation box, the lamp control device can advantageously be used in the installation box instead of said light switch.

In a preferred embodiment of the invention, the circuit configuration for evaluating the Doppler radar module signals has a preamplifier for amplifying electrical signals (Doppler radar module signals) produced and transmitted by the Doppler radar module, and a multivibrator, preferably a temperature-compensated Schmitt trigger having an adaptive threshold, for converting the amplified (analog) Doppler radar module signals into digital signals. The latter advantageously guarantees that the sensor range is as independent of the ambient temperature as possible.

In a further preferred embodiment, a radiation sensor for detecting the brightness in the vicinity of the lamp control device, and a radiation sensor switching unit associated with the radiation sensor are provided. The advantage of this embodiment is, in particular, the fact that it enables the lamp control device to differentiate independently between light and dark and consequently to deactivate the Doppler radar module in daylight, for example.

A further advantageous development of the automatic lamp control device according to the invention additionally has a turn-off unit for switching off the Doppler radar module. The turn-off unit is connected to a control output of a programmable timer. The programmable timer can advantageously be used to switch off the Doppler radar module after a predetermined time period by the turn-off unit when it is light (e.g. daylight) in the vicinity of the lamp control device. Therefore, the current consumption of the lamp control device can be reduced to a minimum.

In a further preferred embodiment of the automatic lamp control device according to the invention, the switch can be actuated manually or by remote control. The switch is provided in a control line of the switching unit and can be used to switch the lamp control device to the following three operating states alternatively:

a) normal operation, in which the Doppler radar module reacts to movements in its vicinity and switches on one or more lamps connected to the switching unit when it is dark in the vicinity of the radiation sensor;

b) standby, in which the lamp(s) is/are not switched on even when there are movements and it is dark in the vicinity of the radiation sensor; and c) continuous light operation, in which the lamp(s) is/are switched on irrespective of movements and brightness in the vicinity of the radiation sensor.

The advantage of this embodiment is that the lamp control device can be used both as a normal light switch (continuously "off" or continuously "on") and as an automatic light switch.

In a further advantageous embodiment of the automatic lamp control device according to the invention, the Doppler radar module is constructed entirely using microstripline technology and is provided with a surface antenna such that it transmits microwave radiation at a frequency of between 1 and 5 GHz, in particular about 2.45 GHz. The advantages of this embodiment are that the Doppler radar module has a particularly space-saving configuration and that it is possible to use the frequency of about 2.45 GHz permitted worldwide in telecommunications engineering for Doppler radar modules.

Other features which are considered as characteristic for the invention are set forth in the appended claims.

Although the invention is illustrated and described herein as embodied in an automatic lamp control device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a side-elevational view of the lamp control device in an assembled ready for use state;

FIG. 3 is a plan view of the lamp control device of FIG. 2;

FIGS. 4a and 4b are timing diagrams for a circuit configuration; and

FIG. 5 is a schematic illustration of a temperature-compensated Schmitt trigger having an adaptive threshold.

DESCRIPTION OF THE PREFERRED EMBODIMENTS

Figure 1:
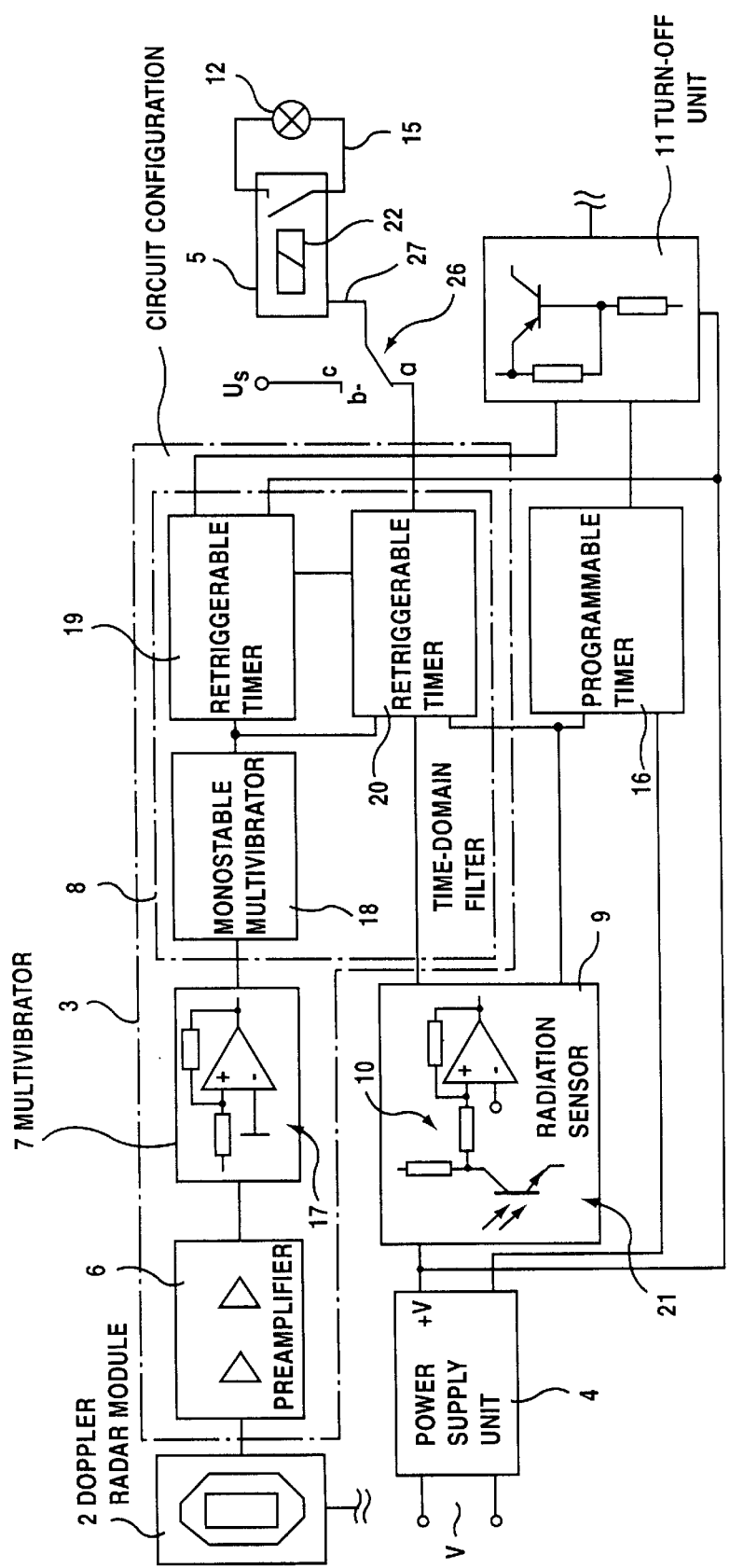
FIG. 1 is a block circuit diagram for a lamp control device according to the invention.

In all the figures of the drawing, sub-features and integral parts that correspond to one another bear the same reference symbol in each case. Referring now to the figures of the drawing in detail and first, particularly, to FIG. 1 thereof, there is shown a lamp control device including a Doppler radar module 2 connected to a preamplifier 6 and a turn-off unit 11. The preamplifier 6, for example a two-stage amplifier having a bandwidth of approximately 25 Hz and a gain factor of 1000, is used to amplify Doppler radar module signals produced by the Doppler radar module 2. A double operational amplifier, for example, may be used for this purpose.

The preamplifier 6 is connected to a multivibrator 7 that, by way of example, has a temperature-compensated Schmitt trigger 17 having an adaptive threshold. The hysteresis of the multivibrator 7 determines the range of the Doppler radar module 2, i.e. the distance of a moving object from the Doppler radar module 2 at which a switching unit 5 is actuated and causes a lamp 12 to be switched on. For this purpose, the switching unit 5 has a relay 22, for example.

The multivibrator 7 is coupled to a time-domain filter 8 which is constructed from a monostable multivibrator 18 (e.g. with t=0.1 seconds), from a first retriggerable timer 19 (e.g. with t=2 seconds) and from a second retriggerable timer 20. The time-domain filter 8 is used to specify a time interval, of variable definition, at the end of which it is possible to activate the second retriggerable timer 20. As a result of this, the susceptibility of the circuit configuration to faults, the switching-on of the lamp on account of interference signals is reduced.

The preamplifier 6, the multivibrator 7 and the time-domain filter 8 form a circuit configuration 3 for evaluating Doppler radar module signals and for producing signals for controlling the switching unit 5.

Furthermore, the lamp control device shown in FIG. 1 additionally has a radiation sensor 9, for example a phototransistor 21 having a radiation sensor circuit unit 10 (for example a Schmitt trigger), which is connected to the second retriggerable timer 20 of the time-domain filter 8, to a programmable timer 16 and to the output V+ of the power supply unit 4.

The programmable timer 16 connected to the power supply unit 4, to the turn-off unit 11, to the radiation sensor 9 and to the second retriggerable timer 20 is used to set any desired time period, after which the Doppler radar module 2 is switched off by the turn-off unit 11 when it is light (e.g. during daylight) in the vicinity of the lamp control device. Therefore, the current consumption of the lamp control device is reduced.

The following is an example of the way in which the time-domain filter 8 works. The monostable multivibrator 18 converts a pulse from the multivibrator 7 into a monopulse with a defined time duration, for example 0.1 seconds. The monopulse is supplied to the first retriggerable timer 19, whose time base is permanently set (e.g. 2 seconds), and to the second retriggerable timer 20, whose time base is of variable definition (e.g. from 2 seconds to approx. 4 minutes). The output signal from the first retriggerable timer 19 determines the time period in which the second retriggerable timer 20 can be triggered.

In this way, for example, a pulse at the input of the monostable multivibrator 18 produces a monopulse of length 0.1 seconds. The negative edge of the monopulse starts the first retriggerable timer 19, and one output of the first retriggerable timer 19 changes to a low level. The second retriggerable timer 20 can be triggered by a further monopulse from the monostable multivibrator 18 only when a low level is present at a first input of said second retriggerable timer 20. Hence, if the monostable multivibrator 18 supplies no further Doppler module signal and thus no further monopulse either, the switching unit 5 is not driven to close a lamp circuit 15. If a second Doppler module signal and hence a second monopulse are transmitted by the monostable multivibrator 18 during a predetermined time period of, for example, 2 seconds, then the switching unit 5, for example a relay, is switched to an on-state by the second retriggerable timer 20.

The radiation sensor 9 ensures the dependency of the lamp control device on the brightness in its vicinity. This makes it possible for the switching unit 5 not to close the lamp circuit 15 when the surrounding area is sufficiently bright (possibly adjustable value), such as in daylight, and hence also for the lamp 12 not to be switched on when there is movement within the range of the Doppler radar module 2.

This exemplary embodiment also provides for the Doppler module 2 to be switched off after a time period that can be set using the programmable timer 16 when there is sufficient brightness in the vicinity of the lamp control device. Therefore, the current consumption of the entire system is reduced to 2 mA, for example. To this end, the information "sufficient brightness" is supplied by the radiation sensor to the programmable timer 16, which then uses the turn-off unit 11 to switch off the Doppler radar module 2 after the predetermined time period, e.g. 10 minutes.

A switch 26 which is provided in a control line 27 of the switching unit 5 and can be actuated manually or by remote control can be used to switch the lamp control device to the following three operating states a, b, c alternatively:

a) normal operation; the switching unit 5 is connected to the circuit configuration 3 via the control line 27. The lamp 12 is switched on when there are movements within the range of the Doppler radar module 2 and it is dark in the vicinity of the lamp control device;

b) standby; the control line 27 is open. The lamp 12 is not switched on even when there are movements within the range of the Doppler radar module 2 and it is dark in the vicinity of the lamp control device;

c) continuous light operation; via the control line 27, the switching unit 5 is continuously connected to a supply potential US which causes the switching unit 5 to switch to on. The lamp 12 is thus switched on irrespective of movements within the range of the Doppler radar module 2 and the brightness in the vicinity of the lamp control device.

FIGS. 2 and 3 are schematic illustrations of the arrangement of the individual circuit components of the lamp control device. In FIGS. 2 and 3, the Doppler radar module 2 has a surface antenna 14 and a radiation frequency of, for example, 2.45 GHz and is disposed on a first printed circuit board 23.

The switching unit 5, the circuit configuration 3 having the preamplifier 6, the multivibrator 7 and the time-domain filter 8, the programmable timer 16 if applicable, the radiation sensor 9 having a radiation sensor circuit unit 10, the turn-off unit 11, and a manually actuable switch 26 are disposed on a second printed circuit board 24. The power supply unit 4 (shielded if necessary) is disposed on a third printed circuit board 25. In this multi-layer printed circuit board configuration 1, the printed circuit boards 23, 24, 25 are disposed above one another at as small a distance from one another as possible. The maximum diameter of the second and third printed circuit boards 24, 25 is 54 mm, for example, so that the entire lamp control device can be installed, by way of example, completely in a standard flush-mounted box 13 having an internal diameter of 55 mm.

FIGS. 4a and 4b show two timing diagrams (voltage U as a function of time t) for the circuit configuration 3 in the event of an interference pulse, and in the event of a movement within the transmitting and receiving range of the Doppler radar module 2, respectively. In the diagrams, S1 is the signal which is received by the multivibrator 7, the preferred temperature-compensated Schmitt trigger having an adaptive threshold (FIG. 5), S2 is the signal transmitted from the multivibrator 7 to the monostable multivibrator 18, S3 is the signal transmitted from the monostable multivibrator 18 to the first 19 and to the second retriggerable timer 20, S4 is the signal transmitted from the first 19 to the second retriggerable timer 20, and S5 is the signal transmitted from the second retriggerable timer 20 to the switching unit 5. In the event of an individual interference pulse, S5 remains at "low" (FIG. 4a); only when a second signal S1 arrives during the time interval in which S4 is at "low" does 5S change to "high" and actuate the switching unit 5, which closes the lamp circuit 15.

The circuit configuration according to the invention avoids the light being continually switched on and off when a short turn-on time is set for the lamps and when there is constant movement in front of the sensor.

We claim:

1. An automatic lamp control device, comprising:

a Doppler radar module outputting Doppler radar module signals;

a lamp circuit;

a switching unit for switching said lamp circuit on and off;

a circuit configuration receiving and evaluating said Doppler radar module signals and producing signals for controlling said switching unit, said circuit configuration having a time-domain filter reducing a susceptibility to faults, said time-domain filter having a monostable multivibrator, a first retriggerable timer coupled to said monostable multivibrator, and a second retriggerable timer coupled to said monostable multivibrator and to said first retriggerable timer, said time-domain filter specifying a variable length time interval after which it is possible to actuate said switching unit; and a power supply unit supplying current to said Doppler radar module and to said circuit configuration.

2. The automatic lamp control device according to claim 1, wherein said circuit configuration has a temperature-compensated Schmitt trigger coupled to said time-domain filter and receiving and converting said Doppler radar module signals into digital signals.

3. The automatic lamp control device according to claim 1, including a radiation sensor coupled to said second retriggerable timer and detecting a brightness of the environment, and a radiation sensor switching unit coupled to said radiation sensor.

4. The automatic lamp control device according to claim 3, including a turn-off unit for switching off said Doppler radar module and coupled to said time-domain filter, and a programmable timer having a control output coupled to said turn-off unit, said programmable timer also being coupled to said radiation sensor and to said time-domain filter.

5. The automatic lamp control device according to claim 4, including at least one lamp coupled to said lamp circuit, said switching unit having a control line with a switch that can be manually actuated and actuated by remote control, said switching unit can be set alternatively to three operating states, including:

a) a normal operating state wherein said control line of said switching unit is connected to said circuit configuration so that said Doppler radar module reacts to movements within a range of said Doppler radar module and switches on said at least one lamp controlled by said switching unit when it is dark in an area of said radiation sensor;

b) a standby state wherein said control line of said switching unit is open so that said at least one lamp is not switched on even when there are movements within said range of said Doppler radar module and it is dark in the area of said radiation sensor; and c) a continuous light operating state wherein said control line of said switching unit is continuously connected to a potential causing said switching unit to switch to on so that said at least one lamp is switched on irrespective of movements within said range of said Doppler radar module and said brightness in said area of said radiation sensor.

6. The automatic lamp control device according to claim 1, wherein said Doppler radar module is formed using microstripline technology and has a surface antenna, said Doppler radar module transmitting microwave radiation at a frequency of between 1 and 5 GHz.

7. The automatic lamp control device according to claim 1, including a single multi-layer printed circuit board configuration mounting said Doppler radar module, said circuit configuration, said power supply unit, said switching unit and said lamp circuit.

8. The automatic lamp control device according to claim 7, including a flush-mounted box having an internal diameter of approximately 55 mm, said multi-layer printed circuit board configuration is installed in said flush-mounted box.

* * * * *